(12) United States Patent
Soerensen (10) Patent No.: US 12,320,334 B2
(45) Date of Patent: Jun. 3, 2025

(54) METHOD FOR CONNECTING A COMPONENT OF A POWER CONVERSION CIRCUIT OF A WIND TURBINE

(71) Applicant: Siemens Gamesa Renewable Energy A/S, Brande (DK)

(72) Inventor: Johnny Soerensen, Videbaek (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 4 days.

(21) Appl. No.: 18/274,268

(22) PCT Filed: Feb. 3, 2022

(86) PCT No.: PCT/EP2022/052615
§ 371 (c)(1),
(2) Date: Jul. 26, 2023

(87) PCT Pub. No.: WO2022/167541
PCT Pub. Date: Aug. 11, 2022

(65) Prior Publication Data
US 2024/0102455 A1    Mar. 28, 2024

(30) Foreign Application Priority Data
Feb. 5, 2021   (EP) ..................... 21155490

(51) Int. Cl.
*F03D 80/80*    (2016.01)
*F03D 13/10*    (2016.01)

(52) U.S. Cl.
CPC ............. *F03D 80/82* (2016.05); *F03D 13/10* (2016.05)

(58) Field of Classification Search
CPC .......... F03D 80/82; F03D 13/10; F03D 80/50; F03D 80/85; F05B 2230/60; F05B 2230/61; Y02E 10/72
See application file for complete search history.

(56) References Cited

U.S. PATENT DOCUMENTS

| | | |
|---|---|---|
| 2010/0011575 A1 | 1/2010 | Numajiri |
| 2013/0259633 A1 | 10/2013 | Meyer et al. |

(Continued)

FOREIGN PATENT DOCUMENTS

| | | |
|---|---|---|
| EP | 2159420 A1 | 3/2010 |
| EP | 2 863 053 B1 | 3/2016 |

(Continued)

OTHER PUBLICATIONS

International Search Report for PCT/EP2022/052615 issued on May 9, 2022.

(Continued)

*Primary Examiner* — Joseph Ortega
(74) *Attorney, Agent, or Firm* — Schmeiser, Olsen & Watts LLP (57) ABSTRACT

A method for connecting a component of a power conversion circuit of a wind turbine to one or more connection device(s) is/are provided, wherein the component is arranged on a supporting structure in the interior of the wind turbine, wherein the connection devices(s) includes/include at least one connector and the component includes at least one counterpart to the connector, comprising: providing the connection device(s) and lifting the component from the supporting structure, arranging the connection device(s) on the supporting structure and aligning the connector of the connection device(s) with respect to the counterpart at the lifted component, and lowering the component onto the supporting structure and thereby establishing a connection between the connector and the counterpart for connecting the component to the connection device(s).

15 Claims, 10 Drawing Sheets

(56) References Cited

U.S. PATENT DOCUMENTS

2015/0108764 A1\* 4/2015 Moeller ................ F03D 80/00
  290/55
2020/0370541 A1   11/2020 Moeller et al.
2022/0260061 A1\* 8/2022 Skjaerbaek ............ F03D 13/20

FOREIGN PATENT DOCUMENTS

| EP | 3 771 825 A1 | 2/2021 |
| TW | 201233898 A | 8/2012 |
| TW | 201940795 A | 10/2019 |
| WO | 2018/133964 A1 | 7/2018 |
| WO | 2018/133965 A1 | 7/2018 |
| WO | 2019/141841 A1 | 7/2019 |

OTHER PUBLICATIONS

Written Opinion Report for PCT/EP2022/052615 issued on May 9, 2022.

\* cited by examiner

METHOD FOR CONNECTING A COMPONENT OF A POWER CONVERSION CIRCUIT OF A WIND TURBINE

CROSS-REFERENCE TO RELATED APPLICATIONS

This application claims priority to PCT Application No. PCT/EP2022/052615, having a filing date of Feb. 3, 2022, which claims priority to EP Application No. 21155490.2, having a filing date of Feb. 5, 2021, the entire contents both of which are hereby incorporated by reference.

FIELD OF TECHNOLOGY

The following relates to a method for connecting a component of a power conversion circuit of a wind turbine to one or more connection means, wherein the component is arranged on a supporting structure in the interior of the wind turbine and wherein the connection means comprises at least one connector and the component comprises at least one counterpart to the connector.

BACKGROUND

The components of a power conversion circuit in modern wind turbines are getting bigger in accordance with the increasing size of the wind turbines and/or with the increasing generation power to 14 MW and above. In addition, also increasing voltage levels used in the power conversion circuit of a wind turbine and/or for conduction of generated electrical energy from the wind turbine to a power grid may influence the size of the components of a wind turbine. In particular, increasing voltage levels from normally 33 kV or 66 kV to a higher voltage level, for instance of 132 kV or more, result in larger components in the power conversion circuit of the wind turbine, or in larger components related to the generation and/or conversion of electrical power, respectively. In addition, also the connection means used for connecting the components are getting larger and accordingly more difficult to handle.

Today, the components of the power conversion circuit, which converts the mechanical energy of the wind into electrical energy, are installed at their intended position usually in a nacelle, inside a tower of wind turbine and/or inside a foundation such as a monopile support structure. The connection to the connections means occurs in the vicinity of the component inside the wind turbine, for instance during an installation of the wind turbine and/or in course of a maintenance procedure. Since the components are placed inside the wind turbine, the space for installing the connection means is limited which renders the connection process tedious and uncomfortable. In addition, the size of the connection means and/or of their connectors used for terminating the connection to the component are restricted to a size that allows for handling of the connection means in the vicinity of the component. However, in particular with respect to larger components, or higher power and/or voltage levels of the wind turbines, respectively, there is a need for facilitating the connection between these components and the respective connection means in the confined space environment inside the wind turbine.

From the state of the art, different methods for installing a wind turbine component in the interior of a wind turbine and for connecting a component of a wind turbine are known.

From WO 2018/133965 A1, a module for accommodating electrical equipment for controlling a wind turbine is known. The module comprises a first platform and a second platform, which are spaced apart but connected with each other by a connection element. The first platform and the second platform are attachable to the tower or to a foundation of the wind turbine. The module and/or electrical components arranged on the module may be inserted in the tower or in the foundation during an installation of the wind turbine.

WO 2018/133964 A1 discloses a platform arrangement of a wind turbine comprising a platform that is destined to be attached to the interior of a tower or a foundation of the wind turbine. Thereby, the platform is a standardised component while a frame attached to the platform is specifically adapted to the dimensions of the specific section of the tower or of the foundation where the platform arrangement is destined to be mounted to. The platform and/or a module comprising a plurality of such platforms and/or electrical components arranged on the platforms may be mounted to the tower of a wind turbine during an erection process of the wind turbine.

In EP 2 863 053 B1, an electric assembly for electrically connecting at least one off-shore wind turbine to a sub-sea cable in a method for mounting the electric assembly is disclosed. The electric assembly comprises a transformer, which is lowered on a platform outside of the tower of the wind turbine, wherein an automatic plug-in connection between an electric connection arrangement of the transformer and a plug connector of the sub-sea cable arranged on the platform is established.

SUMMARY

An aspect relates to a method for facilitating the connection of a component of a power conversion circuit of a wind turbine arranged on a supporting structure in the interior of the wind turbine to a connection means. Hereinafter "connection means" or "connection device" can be used interchangeably.

According to embodiments of the invention, this problem is solved by a method as initially described comprising the steps:
  providing the connection means and lifting the component from the supporting structure,
  arranging the connection means on the supporting structure and aligning the connector of the connection means with respect to the counterpart at the lifted component, and
  lowering the component onto the supporting structure and thereby establishing a connection between the connector and the counterpart for connecting the component to the connection means.

The supporting structure, on which the component is arranged initially, may be for instance a platform in a tower of the wind turbine or in a foundation like a monopile support structure of the wind turbine. Depending on the type of the component, it is also possible that the supporting structure is for instance a bedframe of a nacelle of the wind turbine. The wind turbine may be an on-shore wind turbine or an off-shore wind turbine.

The power conversion circuit and/or the component, respectively, may be adapted to generate and/or to convert electrical power at or to a voltage level between 33 kV and 132 kV, for instance 33 kV, 66 kV, 99 kV, 132 kV, or any other value between 33 kV and 132 kV. It is also possible that the power conversion circuit, or the component, respectively, are adapted to generate and/or to convert electrical power at or to a voltage level above 132 kV.

The inventive method has the advantage that the lifting of the component from the supporting structure provides workspace for arranging of the connection means on the supporting structure. The workspace for arranging of the connection means is therefore not limited by the component itself so that more space for the arrangement of the connection means is created. This facilitates for instance the routing of the connection means to and/or on the supporting structure as well as the alignment of the connection means with respect to the lifted component, or of the connector of the connection means with respect to the counterpart at the lifted component, respectively.

The alignment has the additional advantage that by lowering the lifted component, the connector and its counterpart may be connected to each other, for instance by engaging the connector in the counterpart, so that additional steps of mating the connector and the counterpart can be omitted. This reduces the amount of steps that have to be performed manually during the connection procedure.

Due to the lifting of the component, the amount of workspace for providing the connection means and/or for establishing the connection is increased so that the connection of the component of the power conversion circuit can be conducted more comfortable and more efficient due to the improved working conditions, in particular with regard to the health and the safety of a technician working on the connection. The increased amount of space facilitates the routing of the connection means on the supporting structure.

In addition to facilitating the connection procedure, also the security of the connection procedure is improved since the increased workspace reduces the risk for damaging of the components and/or the connection means, in particular of the connector, and/or the counterpart during the connection procedure and therefore allows for reducing the risk of a failure in the connection to the component. Also, a bending of the connection means prior to establishing the connection to the component is reduced, for instance since more space for handling of tools used for bending of the connection means is provided.

In particular when using a connection means which is adapted to conduct electricity, a connection between the connection means and the component, or between the connector and the counterpart, respectively, has to be conducted with high precision in order to avoid the occurrence of damage to the connector and/or the counterpart which may lead to problems like short circuits and/or arcing between two or more connection means. In addition, due to the increased space, there is less risk of a damage to the connection means during handling since scratches in an insulation resulting from a contact with the environment, or with the component, respectively may be avoided.

The steps of arranging the connection means underneath the supporting structure and of lifting the component may be conducted simultaneously. The component may be for instance an electrical and/or mechanical component of the power conversion circuit of the wind turbine which converts the mechanical energy of the wind into electrical energy. The connection means is in particular cable-like and at least partly flexible so that it may be arranged on the supporting structure and allows for aligning of the connector.

The connection means comprises a connector which corresponds to a respective counterpart at the component, so that the connector and the counterpart are connectable. The connector and the counterpart may be provided for instance as a male connector and a female counterpart, or a female connector and a male counterpart, respectively. The connector may be arranged for example in such manner that it is pointing upwards in the direction of the lifted component, wherein the connector is aligned in such manner that it is underneath its corresponding counterpart at the lifted component.

Since the connection between the component and the connection means is established during the lowering of the lifted component onto the supporting structure, straight connectors of the connection means may be used. Such straight connectors are required in particular for electrical connections at high voltage levels, for instance at 132 kV or more, since angled connectors like T-shaped connectors are only feasible up to voltage levels of 72.5 kV and not available at higher voltage levels. For connection of the straight connectors, the component is adapted to receive the straight connectors in corresponding counterparts, in particular from below or a bottom side of the component, respectively. Since the connection of such straight connectors requires more space for handling than the connection of angled connectors like T-shaped connectors, the connection procedure is significantly facilitated by lifting the component. Furthermore, establishing the connection during the lowering of the component has the advantage that less critical steps have to be performed by a technician since the connectors may be engaged into the counterparts automatically during the lowering so that an optimal termination of the connectors at their counterparts is facilitated.

The inventive method allows for reducing the installation time of the component, or of a wind turbine comprising the component, respectively, which is in particular useful at off-shore wind turbines. The increased amount of available space enables an easier handling of the connection means and therefore a faster routing of the connection means as well as a faster alignment of the connector resulting in a significantly reduced installation time in both on-shore and off-shore wind turbines.

According to embodiments of the invention, an electrical cable and/or a tube for fluid transportation is used as connection means. It is also possible that a plurality of connection means, for instance to provide three electrical phases and/or a ground wire, are used. Also, an electrical cable comprising more than one conductive core and therefore more than one connector may be used. An electrical cable used as connection means may be an undersea cable or an underground cable that is guided to the interior of the wind turbine in a position underneath the supporting structure, on which the component is initially arranged. It is also possible that a combination of one or more electrical cables and/or one or more tubes for fluid transportation are used as a plurality of connection means to be connected to the component.

A tube for fluid transportation may be for instance a tube providing a gaseous medium and/or a liquid medium for pneumatic and/or hydraulic actuators within the component. In addition, or alternatively, the tube may be used for providing a cooling medium, for instance cooling water and/or cooling oil, and/or a lubricant to the component. It is also possible that a tube for fluid transportation is used to supply fresh water and/or sea water to the component.

In an embodiment of the invention, a switch gear unit, a transformer, a power converter, an electrolyser, a fluid storage tank, a water treatment device, or a control cabinet is used as component. A switch gear unit, in particular a gas insulated switch gear, may be used to connect the wind turbine to an external power grid by the at least one connection means. The switch gear unit may comprise for instance a circuit breaker and one or more connection portions that each comprise at least one counterpart for establishing a connection to a connection means. The switch gear unit may be placed separately from other components on a supporting structure inside the tower. The switch gear unit is in particular arranged in a sealed compartment accessible through a blast door for safety reasons. It is also possible that the switch gear unit, the transformer and/or the power converter are connected to at least one internal connection means, which connects a switch gear unit, a transformer and/or a power converter to each other and/or to further components of the power conversion circuit of the wind turbine. The component may also be a control cabinet comprising electronic control devices and/or power electronics.

The component may also be a device involved in an electrolysis process, for instance an electrolyser, a fluid storage tank, or a water-treatment device. An electrolyser may be used to produce hydrogen and oxygen from water by electrolysis. A water treatment device may be for instance a desalination device, which may be used to produce fresh water, or desalinated water, respectively, from sea water supplied to the desalination device for instance via a connection means. The desalinated water may then be used in an electrolyser. The component may also be a fluid storage tank, in which water or a gas like hydrogen or oxygen is stored, in particular in conjunction with an electrolysis process.

In an embodiment, an actuator arranged on the supporting structure and/or an actuator arranged on a further supporting structure, which is arranged above the supporting structure, is used for lifting the component. The component may be lifted for instance by a mechanic, electric, hydraulic and/or pneumatic actuator like a piston that lifts the component from the supporting structure. The hydraulic and/or pneumatic actuator may be arranged on the supporting structure so that it may lift the component from the supporting structure. In addition, or alternatively, also an actuator arranged on a further supporting structure above the supporting structure, or above the component, respectively, may be used. Such an actuator may be for instance a crane and/or a hoist, which is arranged on the further supporting structure, for instance a further platform, arranged above the component. Also, the usage of a mechanic, electric, pneumatic or hydraulic actuator arranged on the further supporting structure above is possible.

In an embodiment of the invention, the lifted component is suspended using at least one suspension support arrangement and/or the lifted component is suspended by arranging and/or fixating the component on a further supporting structure above the supporting structure. By suspending the lifted component, a secure working underneath the lifted component is enabled. The component may be suspended for instance using a suspension support arrangement like one or more stuts, which for instance support the lifted component on the supporting structure.

In addition, or alternatively, the component may also be suspended by fixating it on the further support structure, for instance by bolting the component to a structure like a platform, so that it remains secured in the lifted position. It is also possible that the component is lifted through a hatch of a further supporting structure arranged above the supporting structure, from which the component is lifted. After lifting the component through the hatch, the hatch may be closed and the component may be arranged on the supporting structure, in particular on the closed hatch, so that it remains secured on the further supporting structure, in particular during the arrangement of the connection means on the original supporting structure of the component.

In an embodiment, the connection means is arranged on the supporting structure by guiding the connection means from below the supporting structure through an opening in the supporting structure. The connection means may be guided for instance from a further supporting structure, or platform, respectively, which is arranged below the supporting structure that initially supports the component. The opening in the supporting structure may be for instance covered by a hatch or the like.

The connection means may be guided for instance from an outside of the wind turbine to the further supporting structure below when it is provided. Then, it may be routed from the supporting structure through the opening to the supporting structure, from which the component was lifted. Since the component is lifted, the arrangement of the connection means and/or the routing of the connection means towards the original platform of the component are facilitated due to the increased workspace.

In an embodiment, a connection means comprising a conical connector and a counterpart comprising a conical socket or a connection means comprising a conical socket and a counterpart comprising a conical connector are used. A conical connector, or a conical counterpart, respectively, may have the shape of a cone or of a frustum of a cone, respectively. A conical connector may then be engaged in a conical socket, which comprises a corresponding geometry to the connector, to establish a connection between the connector and the counterpart. Correspondingly, it is also possible to mate a connector which comprises a conical socket with a counterpart comprising a conical connector. A conical shape of the connector and the counterpart facilitates the mating of the connector and the counterpart and/or a proper arrangement of the component during lowering of the component.

In particular, the conical connector may be arranged in such manner on the supporting structure that its tip is pointing upwards to the lifted component. A connector comprising a conical socket may be arranged in such manner that a conical counterpart with its tip, or its top section, pointing downwards from the lifted component may be engaged in the conical socket by lowering the lifted component. A conical connector and a conical socket form a straight connector and a straight counterpart, so that they may be used in particular for establishing electrical connections of a high voltage level, in particular of 72.5 kV and more.

In an embodiment, the connection means is arranged on the supporting structure using a connector support frame, wherein the connector support frame is arranged on the supporting structure and the connector is mounted on the connector support frame in a distance to the supporting structure and facing upwards towards the lifted component. By using the connection support frame, the connectors can be arranged for example to a top section of the connector support frame and therefore in a distance to a top side of the supporting structure. This facilitates the arrangement of the connection means on the supporting structure and also the alignment of the connector of the connection means.

The mounting of the connector to the connector support frame may occur for instance by clamping the connector, or the connectors, respectively, to the connector support frame, in particular to a top section of the connector support frame. In addition, or alternatively to the clamping, also another detachable fixation may be used. Furthermore, it is possible that an attached connector and/or a top section of the support frame may be moved laterally for facilitating the alignment of the connectors with respect to their counterparts.

In an embodiment, a connector mounted on the connector support frame is arrangeable in a distance between 0.75 m to 1.75 m from a top surface of the supporting structure. The top surface of the supporting structure faces towards the component, or the lifted component, respectively. By allowing an arrangement of the connectors in a distance between 0.75 m to 1.75 m from the top surface of the supporting structure, a good working position for a technician that mounts the connectors to the connector support frame is provided.

In an embodiment of the invention, the connector support frame is height-adjustable and/or collapsible, wherein the support frame is lowered and/or collapsed after connecting the connector to the counterpart and/or during the lowering of the component towards the supporting structure. The support frame may comprise for instance a gas pressure spring or a mechanical collapsible and/or foldable structure, so that the connector support frame may be adjusted in height and/or collapsed. Adjusting the connecting support frame in height allows for adapting the height of a top section of the mounting frame and/or of the connectors, for instance to the preferred working position of a technician mounting the connectors to the connector support frame.

In addition, it is also possible to adjust the height of the connector support frame prior and/or after the mounting of the connectors to a height which is suitable to mate the connectors with the corresponding counterpart at the component during lowering of the component. Depending on the position of the counterparts on the component, the connector support frame may be collapsed after connecting the connector to the counterpart and/or during a subsequent lowering of the component towards the supporting structure, so that the component may be arranged in its dedicated position on the supporting structure unobstructed by the connector support frame. After arranging the component on the supporting structure, the connector support frame may be removed or kept in position if necessary.

In an embodiment of the invention, at least one guiding means or guiding device is used, which guides the component during lowering at least in the vicinity of the connectors by at least partly limiting a lateral movement of the component during lowering. The guiding means may be arranged on the supporting structure and/or on a connector support frame in particular after the component has been lifted from the supporting structure.

Using the guiding means, the arrangement of the component on the supporting structure during lowering is facilitated. In particular, also a mating of the connector and the corresponding counterpart is facilitated by the guiding means. This has the advantage that an occurrence of damage to the connector and/or a counterpart during engaging the connector and the counterpart may be prevented by restricting the lateral movement of the component, in particular when connecting for instance a metallic connector to a at least partly metallic counterpart for establishing an electrical connection to the component. In particular when connecting the component to a connection means which is provided for conducting high power electricity at a high voltage level, the occurrence of damage to the connector and/or to the counterpart increases the risk of an electrical failure at the connection between the connector and the counterpart.

In an embodiment, a guiding funnel is used as guiding structure. A guiding funnel guides for instance a support frame, which is arranged at the bottom side of the component, so that the component can be lowered aligned to the at least one connector of the connection means arranged on the supporting structure. A guiding funnel may comprise for instance two pairs of opposingly arranged guiding surfaces, wherein each guiding surface is tilted in such manner that a restriction of the lateral movement of the lowered component increases during the approach of the component towards the at least one connector. The guiding funnel, or the guiding surfaces, respectively, may be attached for instance directly at the supporting structure and/or at a connector support frame arranged on the supporting structure.

In an embodiment of the invention, at least one conical guiding pin is used as guiding structure, wherein the guiding pin is engageable into a corresponding conical guiding orifice at the component. The conical guiding pin may be engaged in the conical guiding orifice during the lowering of the component so that an alignment of the component to the guiding pin and therefore an alignment of the component to the supporting structure and/or the connection means is provided. It is in particular possible that the guiding pin is used in addition to a guiding funnel further facilitating the arrangement of the component.

A conical guiding pin may protrude in particular higher in the direction towards the lifted component than a connector of the connection means so that the guiding pin engages with the corresponding guiding orifice before the connectors are mated with their counterparts during the lowering of the component. In this manner, a precise arrangement of the component during lowering is possible so that the occurrence of damage to the connectors and/or the counterparts during the lowering and/or the connecting between the connection means and the component can be minimised.

In an embodiment, at least one guiding counterpart element is mounted to the component prior to or during the lowering, wherein the guiding counterpart element comprises the conical guiding orifice. The at least one guiding counterpart element may be for instance mounted to a support frame of the component. After arranging the component on the supporting structure and hence after connecting the component to the connection means, the guiding counterpart element and/or the guiding structure may be removed. It is also possible that the guiding structure and/or the guiding counterpart element remain mounted to the supporting structure and/or the component, respectively.

BRIEF DESCRIPTION

Some of the embodiments will be described in detail, with reference to the following figures, wherein like designations denote like members, wherein.

DETAILED DESCRIPTION

Figure 1:
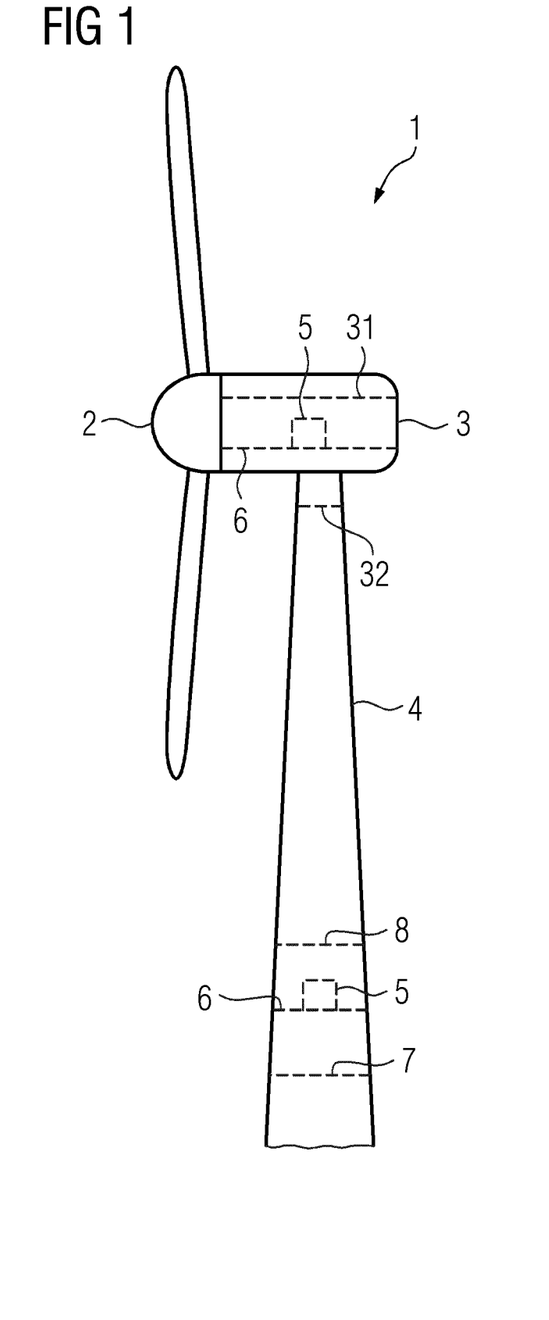
FIG. 1 shows a sideview of a wind turbine.

In FIG. 1, a side view of a wind turbine 1 is shown. The wind turbine 1 may be an offshore wind turbine or an onshore wind turbine and comprises a rotor 2 which is mounted on a nacelle 3. The nacelle 3 is located on top of a tower 4 of the wind turbine 1. The wind turbine 1 comprises a power conversion circuit which converts mechanic energy of the wind actuating the rotor 2 into electric energy. The power conversion circuit may comprise a plurality of components 5. The components 5 are arranged in the nacelle 3 and in the tower 4 of the wind turbine 1 on supporting structures 6, 30.

The components 5 may each be an electrical component, for instance a switch gear unit, a transformer, a power converter or a control cabinet. It is also possible that the component 5 is a device used in an electrolysis process, like an electrolyser for gas generation, a fluid storage tank, or a water treatment device like a desalination device.

The components 5 are arranged on the supporting structures 6, 30 in the interior of the wind turbine 1. A supporting structure 30 in the nacelle 3 of the wind turbine 1 may be for instance a bedframe of the nacelle 3. A supporting structure 6 arranged in the tower 4 of the wind turbine 1 may be for instance a platform arranged inside the tower 4. The supporting structure 6 may be arranged in a top section of the tower 4 and/or in a basement or monopile section, respectively, of the tower 4. At least one further supporting structure 7 is arranged above the supporting structure 6 in the tower 4 and at least one further supporting structure 8 is arranged below the supporting 6 supporting the component 5.

If the component 5 is a switch gear unit arranged on the supporting structure 6, the compartment between the supporting structure 6 and the further supporting structure 8, or between the further supporting structure 7 and the further supporting structure 8, respectively, may be a sealed compartment, accessible for instance through a blast door (not shown) arranged in a wall of the tower 4. The supporting structures 6, 7 and 8 may be connected for instance by ladders or like so that a technician may move between the supporting structures 6 to 8.

The supporting structures 6 to 8, which are provided as platforms, may be arranged in a rack system facilitating their insertion in the tower 4, or in a segment of the tower 4, during erection of the wind turbine 1. Also, a lowering of a tower segment over such a rack is possible during the erection of the wind turbine 1.

Also for a supporting structure 30 arranged in the nacelle 3, a further supporting structure 31 above the supporting structure 30, for instance in a roof section of the nacelle 3, and or at least one further support structure 32 arranged below of the supporting structure 6, for example in a top section of the tower 4, may be provided.

Figure 2:
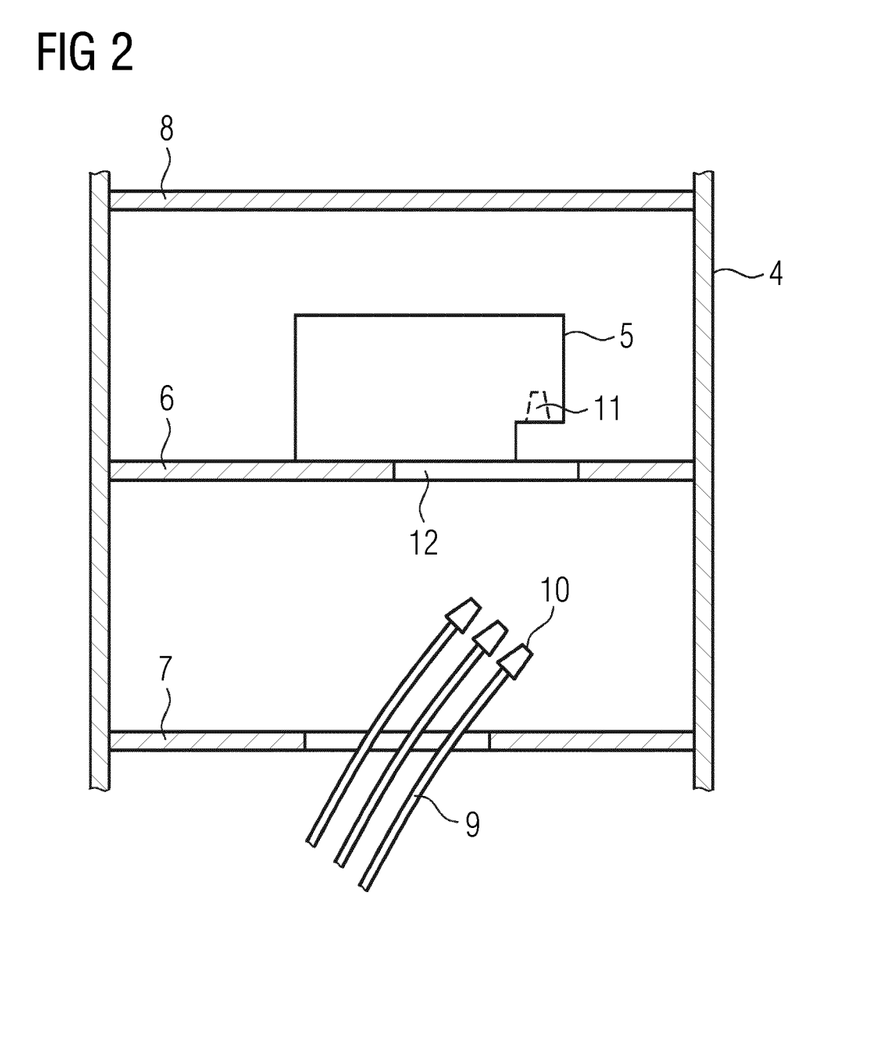
FIG. 2 shows a first detailed view of a wind turbine for illustrating an embodiment of a method.

In FIG. 2, a detailed view of the wind turbine 1 is shown depicting the component 5 arranged in the interior of the tower 4 illustrating an embodiment of a method for connecting the component 5 of the power conversion circuit of the wind turbine 1 to a plurality of connection means 9. This connection may occur during the erection of the wind turbine 1. It is therefore not necessary that a segment of the tower 4 has already been placed around the supporting structures 6 to 8 and/or that further components of the wind turbine 1, like the nacelle 3 or the rotor 2, have already been mounted.

The component 5 is arranged on the supporting structure 6, which is provided as a platform in the interior of the tower 4. Below the supporting structure 6, the further supporting structure 7, also realised as a platform, is provided. Additionally, also above the supporting structure 6, a further supporting structure 8, also realised as a platform, is arranged.

For instance, during an erection process of the wind turbine 1 and/or in course of a repair procedure or the like, a connection of the component 5 to one or more connection means 9 may become necessary. The connection means 9 are cable-like connection means 9 like electrical cables and/or tubes for fluid transportation. By the connection means 9, the component 5 may be connected to a further component 5 of the power conversion circuit of the wind turbine 1. It is also possible that the component 5 is connected by the connection means 9 to a power grid outside of the wind turbine 1. In addition, or alternatively, the connection means 9 may be tubes used for a supply of at least one liquid or gaseous medium for hydraulic and/or pneumatic actuation of the component 5. It is also possible that the connection means 9 are used for supplying or removing a cooling medium like cooling water or transformer oil to or from the component 5 and/or for suppling a fluid medium in an electrolysis process, for instance sea water to a component 5, which is a desalination device, and/or fresh water, or desalinated sea water, respectively, to an electrolyser used as component 5. Also, gas produced in an electrolysis process, like hydrogen and/or oxygen, may be conducted using the connection means 9.

In this embodiment, the connection means 9 are realised as electrical cables connected or connectable to a power grid outside of the wind turbine 1. The connection means 9 are provided on the further supporting structure 7, for instance by guiding and/or pulling them through the tower 4 from the outside of the wind turbine 1 through an opening in the supporting structure 7, for instance from a seabed in case of an offshore wind turbine or from the ground in case of an onshore wind turbine 1.

Each of the connection means 9 comprises a conical connector 10, which is connectable to a corresponding counterpart 11 of the component 5. The connectors may be prepared for instance after pulling the connection means 9 on the supporting structure 7. Alternatively, the connectors 10 may be provided later after arranging the connection means 9 on the supporting structure 6. The counterparts 11, from which only one is shown, comprise each a conical socket connectable to one of the connectors 10 of the connection means 9.

Due to the size of the component 5, the workspace around the component 5 in the interior of the wind turbine 1 is limited. However, in order to connect the connectors 10 of the connection means 9 to the respective counterparts 11 under component 5, the connection means 9 has to be guided for instance through an opening 12 in the supporting structure 6 and routed towards the counterparts 11 of the component 5.

Figure 3:
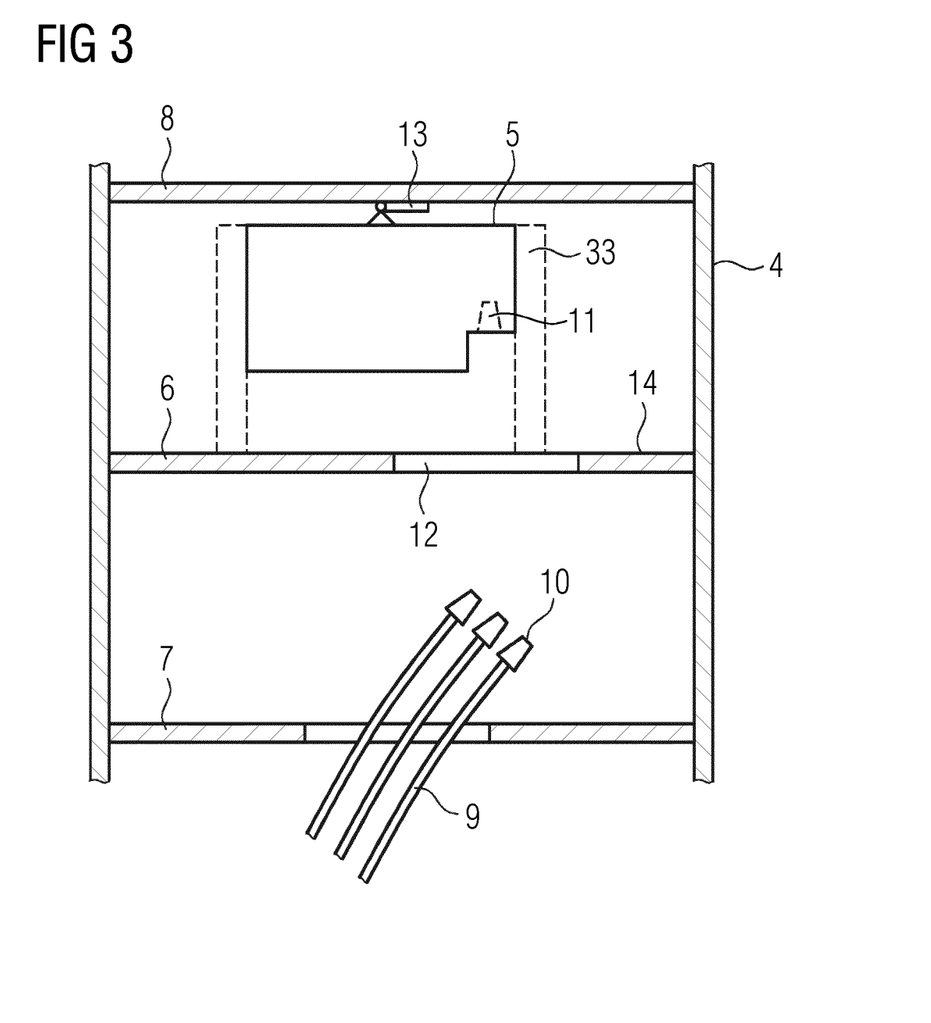
FIG. 3 shows a second detailed view of a wind turbine for illustrating the embodiment of a method.

As is depicted in FIG. 3, to facilitate the connection between the connection means 9 and the component 5, the component 5 is lifted from the supporting structure 6 to provide more workspace on the supporting structure 6, in particular underneath the component 5. The component 5 is lifted using an actuator 13 arranged at the further supporting structure 8 above the supporting structure 6.

The actuator 13 is for instance a crane or a hoist which is coupled to the component 5 and used for lifting of the component 5. In addition, or alternatively, one or more actuators 33 may be used for lifting the component 5, wherein the actuators 33 may be provided as mechanic, electric, hydraulic and/or pneumatic actuators coupled to the supporting structure 6 and lifting the component 5 from the supporting structure 6. The actuators 33 may be realised for instance as hydraulic and/or pneumatic pistons, which push the component 5 from a top surface 14 of the supporting structure 6, or as electrically and or mechanically moveable actuators that are adapted for lifting the component 5. It is also possible that the actuators 33 are mounted to the further supporting structure 8 for lifting the component 5.

After lifting of the component 5, the component 5 may be suspended in the lifted position. Therefore, the component 5 may be coupled for instance to the further supporting structure 8, for instance by bolting. In addition, or alternatively, at least one suspension support arrangement (not shown) may be used to suspend the lifted component 5. The suspension support arrangement may comprise for instance one or more struts or frames arranged on the supporting structure 6 supporting the component 5 in the lifted position. By suspending the component 5, the component 5 is secured against an unintended lowering so that a safe workspace underneath the lifted component 5 is created.

Figure 4:
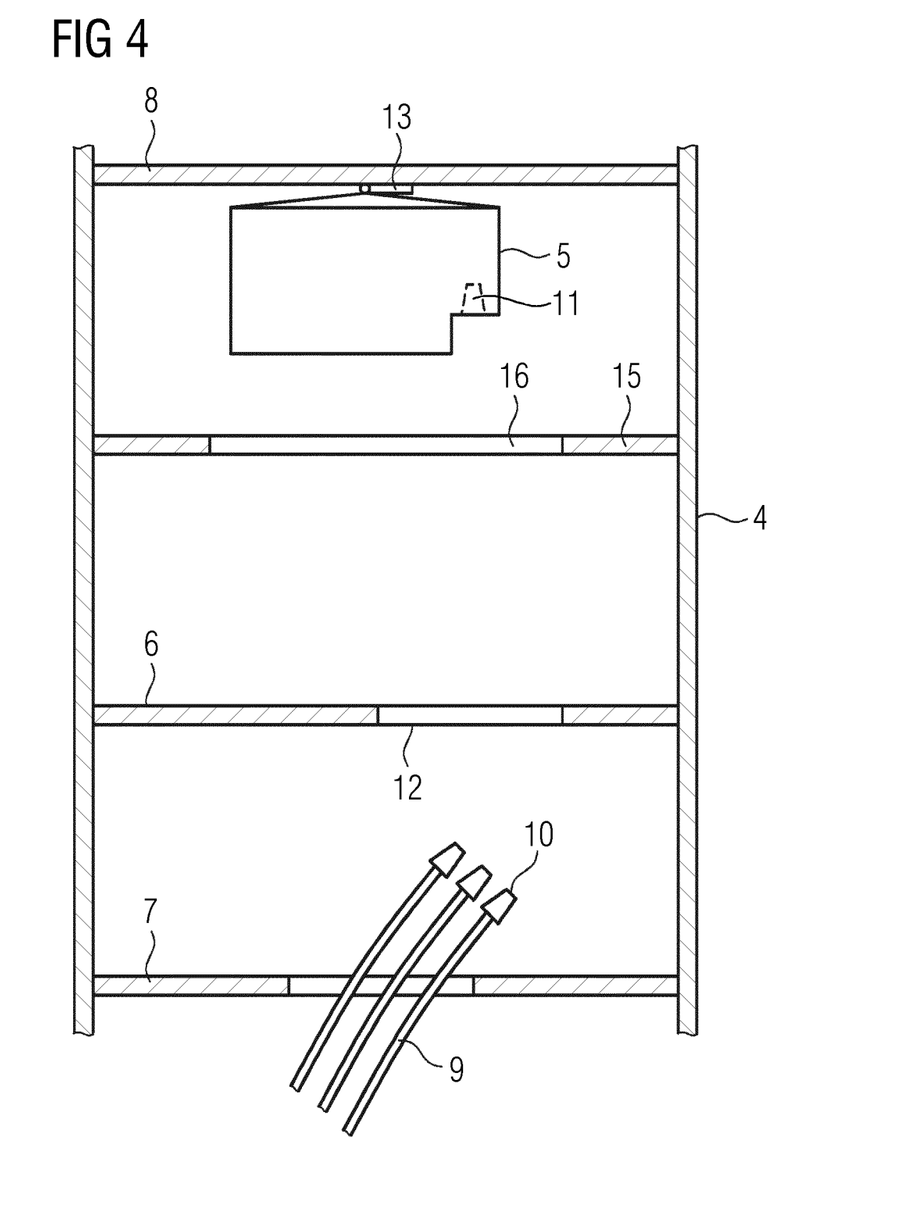
FIG. 4 shows a third detailed view of a wind turbine for illustrating the embodiment of a method.

In FIG. 4, an alternative for lifting and suspending of the component 5 is shown. In this alternative, the component 5 is lifted by using a hoist as actuator 13, wherein the hoist is coupled to the further supporting structure 8. Between the further supporting structure 8 and the supporting structure 6, on which the component 5 was originally arranged, an intermediate supporting structure 15, which is also a platform, is arranged. The intermediate supporting structure 15 comprises an opening 16 which may be closable for instance by a hatch.

The component 5 is lifted towards the supporting structure 8 above the intermediate supporting structure 15 through the opening 16 using the actuator 13 coupled to the further supporting structure 8. Then, the component 5 may be arranged for instance on the closed hatch covering the opening 16 so that the component 5 is suspended on the intermediate supporting structure 15 providing the workspace on the supporting structure 6 for the subsequent arrangement of the connection means 9.

Figure 5:
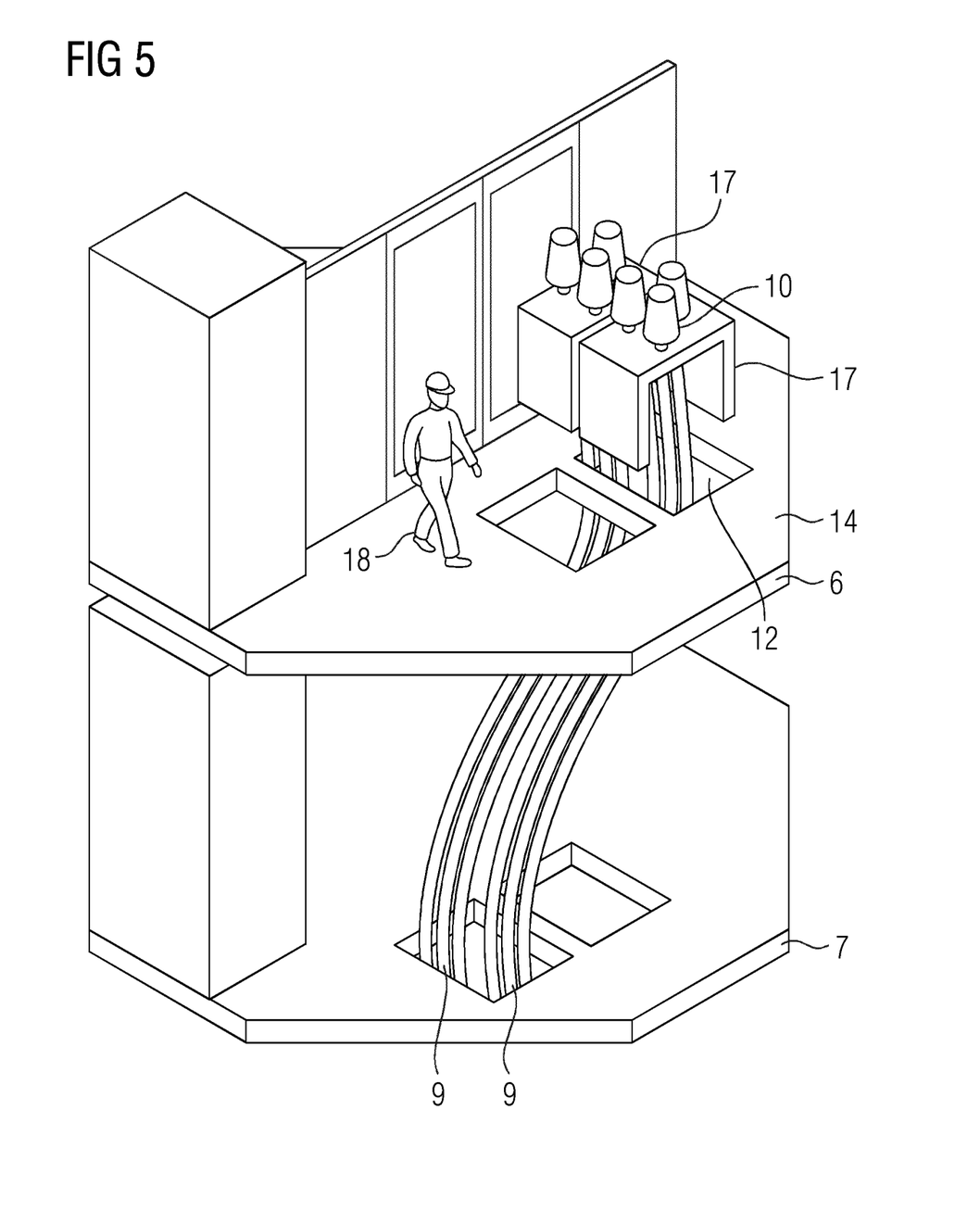
FIG. 5 shows a first perspective view of a wind turbine for illustrating the embodiment of a method.

In FIG. 5, a perspective view of the detail of the wind turbine 1 is shown depicting the step of arranging the connection means 9 on the supporting structure 6. The connection means 9 are routed through the opening 12 in the supporting structure 6. The arrangement of the connection means 9 and a supporting structure 6 occurs in such manner that the connectors 10 of the connection means 9 are aligned to their respective counterparts 11 at the lifted component 5, which is not shown in FIG. 5.

To facilitate both the arrangement of the connection means 9 on the supporting structure 6 as well as the alignment of the connectors 10 of the connection means 9 for each three-phase connection comprising three connection means 9, a connector support frame 17 is used. By the connector support frames 17, the connectors 10 mounted on one of the connector support frames 17 are arranged in a distance to the top surface 14 of the supporting structure 6.

The connector support frames 17 are arranged on the supporting structure 6, wherein the connectors 10 or the connection means 9 are mounted to the connector support frame 17.

Therefore, the connection means 9 may be pulled through the opening 12 and fixated for instance by clamping to the supporting structure 6 in a temporary position prior to an arrangement of the connector support frames 17 and the mounting of the connectors 10 to the connector support frames 17. In the temporary position, the connectors 10 of the connection means 9 may be arranged on the connection means 9 if this step was omitted after providing the connection means 9 on the supporting structure 7. Alternatively, the connector support frames 17 may be arranged on the supporting structure 6 prior to the pulling in of the connection means 9 to the supporting structure 6 allowing to directly mount the connectors 10 to the connector support frames 17.

To facilitate the arrangement of the connection means 9 and the alignment of the connectors 10, the connectors 10 mounted on the support frame 17 are arrangeable in a distance between 0.75 m to 1.75 m from the top surface 14 of the supporting structure 6. This allows for a good working position for a technician 18 working on the connection of the component 5.

Figure 6:
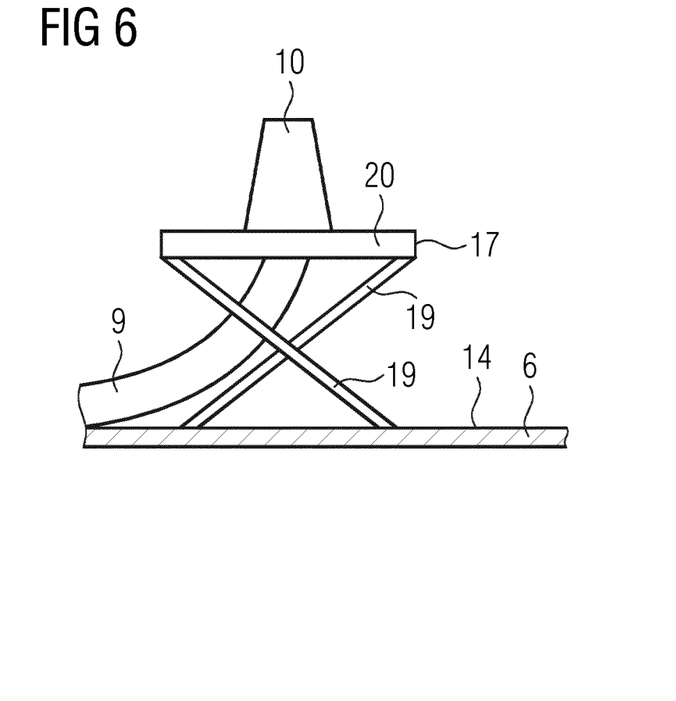
FIG. 6 shows a first embodiment of a connector support frame usable in an embodiment of a method.

In FIG. 6, a detailed view of a first embodiment of a connector support frame 17 is shown. The connector support frame 17 is height-adjustable and collapsible, so that a support frame 17 may be lowered and/or collapsed after connecting the connector 10 to the counterpart 11 on the component 5, as described later. A collapsible connector support frame 17 may be collapsed during the lowering of the component 5 towards the supporting structure 6 in order to not obstruct the component 5 during arrangement. Furthermore, a height-adjustable connector support frame 17 may be adjusted in height in order to provide the preferred working height for the technician 18. The connector support frame 17 comprises two moveably coupled struts 19 which allow for height adjustment and/or collapsing the connector support frame 17.

The connectors 10 are coupled to a top section 20 of the connector support frame 17, for instance by clamping them to the support frame 17 or by using another method of fixation. In addition, the connectors 10 may be aligned towards their respective counterparts 11 during the mounting procedure and/or by laterally moving them in the plane of the top section 20 after their attachment to the connector support frame 17.

Figure 7:
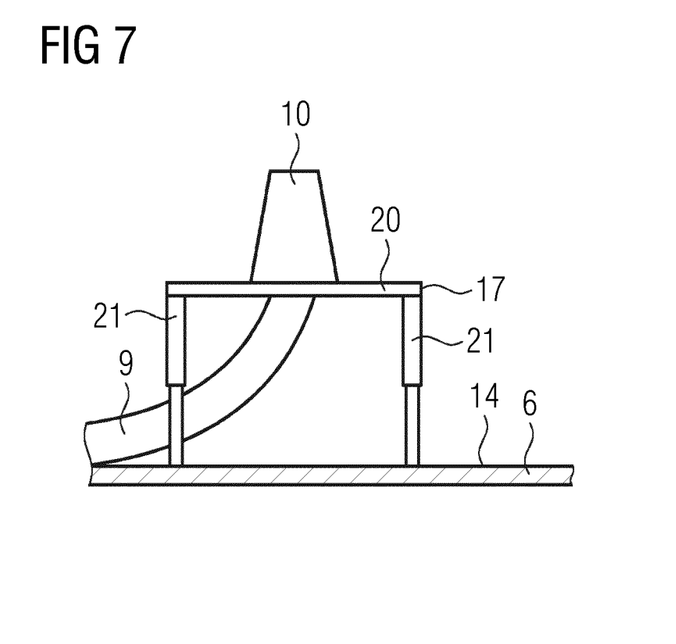
FIG. 7 shows a second embodiment of a connector support frame usable in an embodiment of a method.

In FIG. 7, a detailed view of a second embodiment of a connector support frame 17 is shown. In this embodiment, the connector support frame 17 comprises two gas compression springs 21, which couple the top section 20 of the connector support frame 17 to the top surface 14 of the supporting structure 6. By the gas compression springs 21, the height of the mounting section of the connector support frame 17 may be lowered and/or the connector support frame may be collapsed, in particular when the connector 10 engages into the counterpart 11, so that the lowering of the component 5 and/or the arrangement of the component 5 on the supporting structure 6 is not obstructed by the connector support frame 17.

Figure 8:
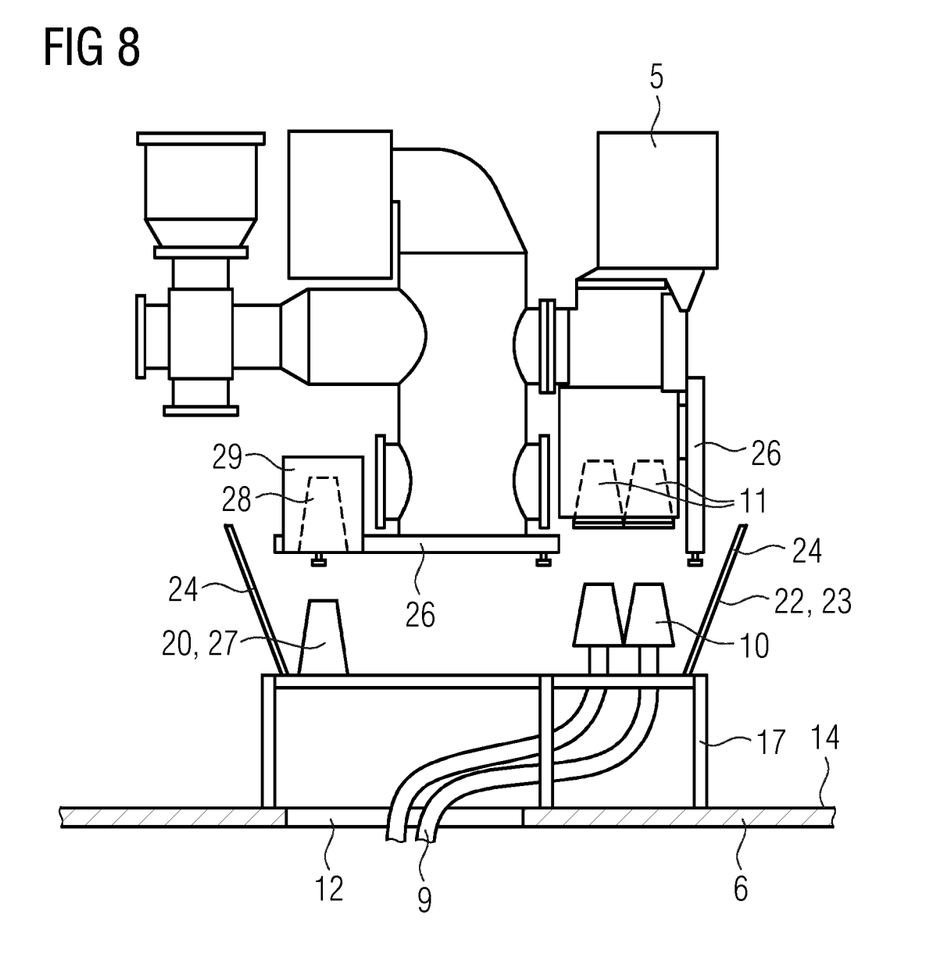
FIG. 8 shows a side view of a lifted component illustrating the embodiment of a method.

In FIG. 8, the step of lowering the component 5 to the supporting structure 6 is depicted. By the lowering of the component 5, a connection between the connectors 10 and the counterparts 11 for connecting the component 5 to the connection means 9 occurs. The component 5 is provided as a gas insulated switch gear unit, which is connected to six connection means 9, which provide two three-phase connections to the component 5. It is also possible to connect a component like a gas insulating switch gear to more or less than six connection means 9. The switch gear unit may be connected to three connection means 9 when only the wind turbine 1 comprising the switch gear unit is connected to a power grid. It is also possible that the wind turbine 1 serves as a hub connecting more than one wind turbine to a power grid, so that additional three-phase connections, or corresponding connection means 9, respectively, from further wind turbines are connected or connectable to the switch gear unit. In addition, or alternatively, two neighbouring wind turbines of the wind turbine 1 may be connected to the switch gear unit to allow for establishing a serial or parallel connection of a plurality of wind turbines 1.

The conical connectors 10, which are provided as straight connectors and which are arranged on the connector support frames 17, are pointing upwards towards the lifted component 5 in their mounted state on the connector support frame 17. Furthermore, the connectors are aligned with respect to their corresponding counterparts 11 of the component 5.

In order not to damage the connectors 10 when the component 5 is lowered on the connectors 10, guiding means 22 are used. The guiding means 22 are provided by guiding structures that are arranged on the connector support frame 17. In addition, or alternatively, the guiding means 22 may also comprise guiding structures that are arranged on the supporting structure 6.

Figure 9:
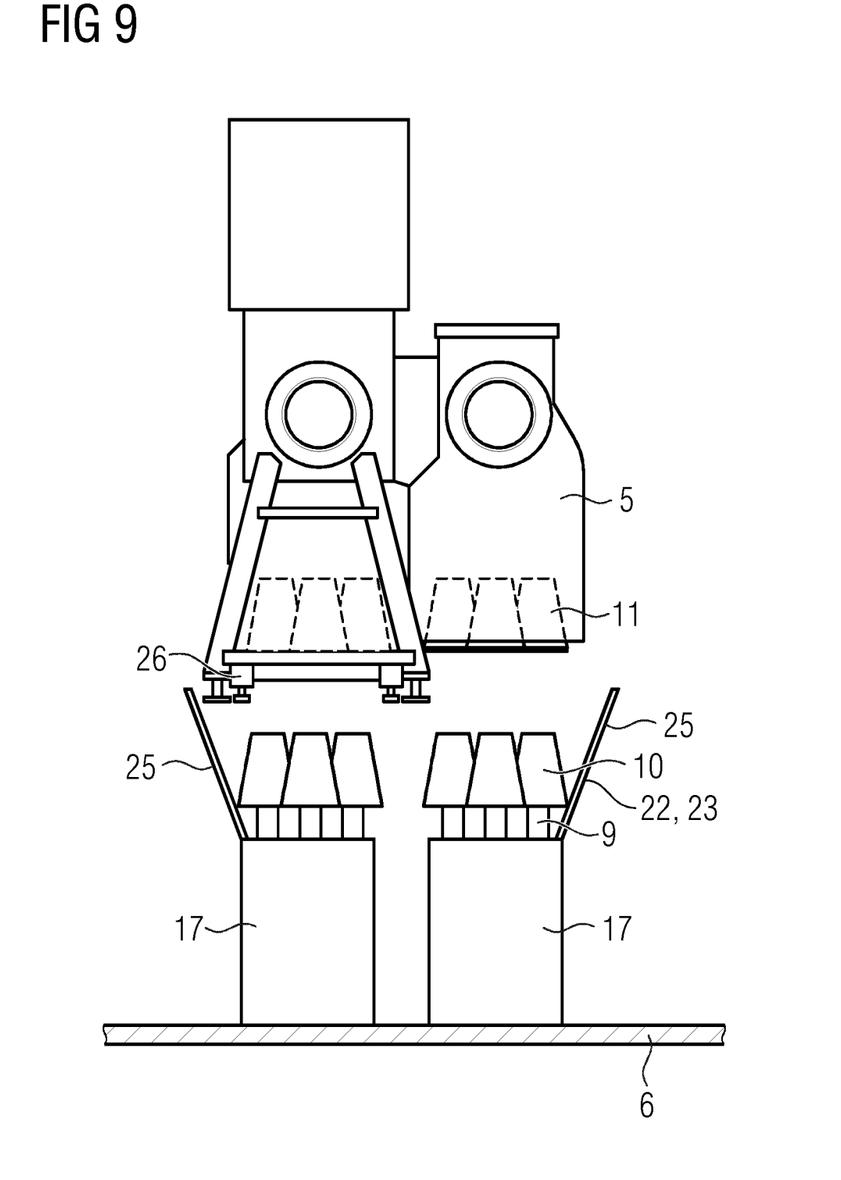
FIG. 9 shows a front view of a lifted component illustrating the embodiment of a method.

One of the guiding structures is provided as a guiding funnel 23 comprising two pairs of opposingly arranged sidewalls 24, 25, which each are tilted to form a funnel shape for guiding the component 5 to the connectors 10. The sidewalls 25 of the guiding funnel 23 are depicted in FIG. 9 showing a front view of the component 5. The guiding funnel 23 guides in particular a support frame 26 of the component 5, which is arranged on a bottom side of the component 5.

In addition, a guiding structure provided as a guiding pin 27 is used. The guiding pin 27 comprises a conical shape which corresponds to a guiding orifice 28 at the support frame 26. The guiding orifice 28 is provided by a guiding counterpart element 29, which may be part of the component 5 and/or which may be attached to the component 5, for instance to the support frame 26, prior to, during the lifting and/or in a suspended position of the component 5. The conical guiding pin 27 protrudes higher towards the lifted and/or suspended component 5 than the connectors 10 in order to first engage into the guiding orifice 28 of the guiding counterpart element 29 during lowering of the component 5. This further facilitates the alignment between the connectors 10 and their respective counterparts 11 since a lateral movement of the component 5 during lowering is more and more restricted when the component 5 approaches the supporting structure 6, or when the counterparts 11 approach the connectors 10, respectively.

Also, by the guiding funnel 23, the component 5 is guided during the lowering in the vicinity of the connectors 10 by at least partly limiting a lateral movement of the component 5 during lowering. The limitation of the lateral movement of the component 5 provided by the guiding means 22 allows for directly guiding the counterparts 11 on the connectors 10 so that the connectors 10 may engage into the counterparts 11 without any damage occurring to the connectors 10 and/or to the counterparts 11.

In particular at connectors 10, which are used for connecting high voltage electrical conductors as connection means 9 to the component 5, damage like scratches in a surface of the connectors 10 and/or of the counterparts 11 may limit the reliability of the electrical connection between the connection means 9 and the component 5 since they may cause problems and/or defects when the electrical connection between the connection means 9 and the component 5, or between the wind turbine 1 and the power grid, respectively, is established.

Figure 10:
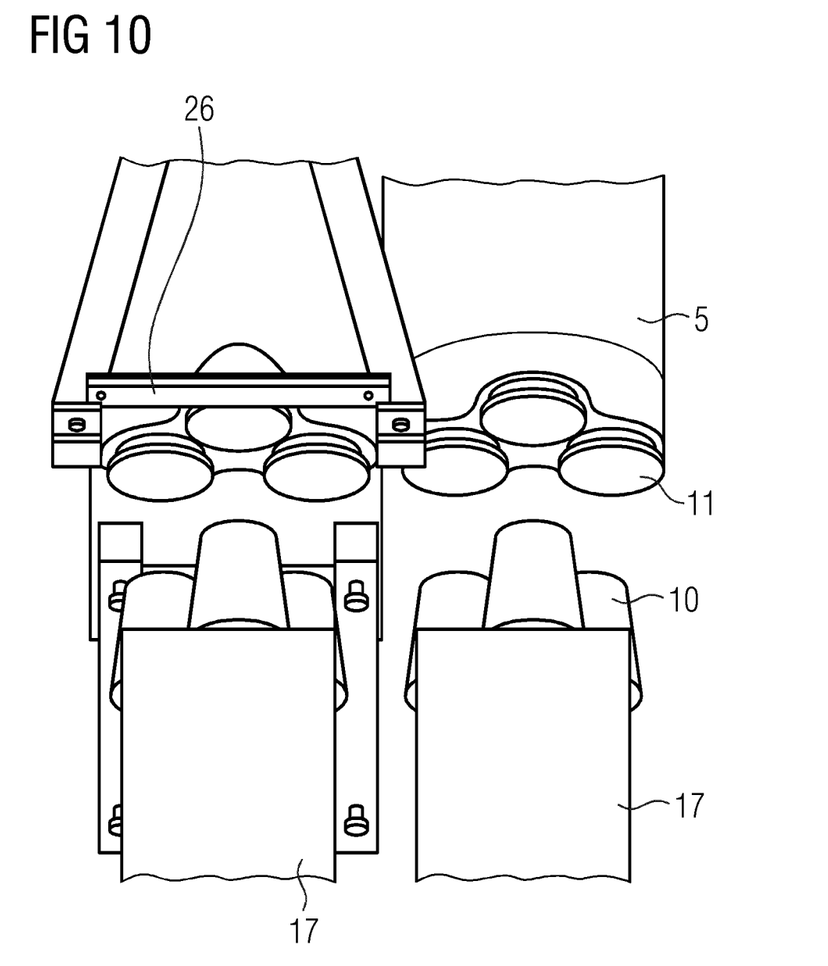
FIG. 10 shows a perspective view of a lifted component illustrating the embodiment of a method.

In FIG. 10, a perspective view of the counterparts 11 at the component 5 is shown. The conical connectors 10 of the connection means 9 are forming a male contacts, wherein the counterparts 11 each form a female contact for mating the male contact 10. It is alternatively possible that the connectors 10 of the connection means 9 are formed as female connectors, for instance as conical socket, wherein the counter parts 11 on the component 5 are formed as male connectors, for instance as conical connectors engageable into the conical socket of the connectors 10. Besides the conical shape of the connectors 10, also other, in particular straight, shapes of the connectors 10 may be used.

Figure 11:
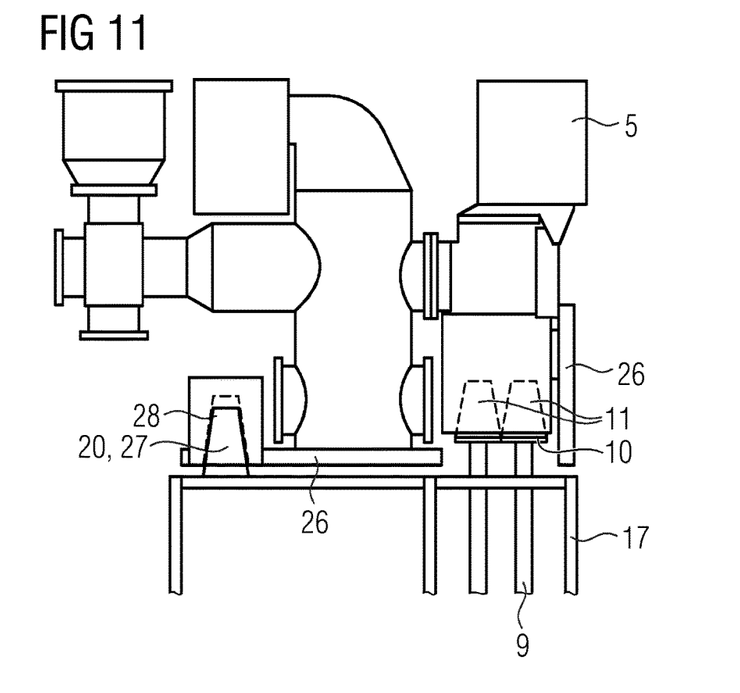
FIG. 11 shows a side view of a lowered component illustrating the embodiment of a method.
Figure 12:
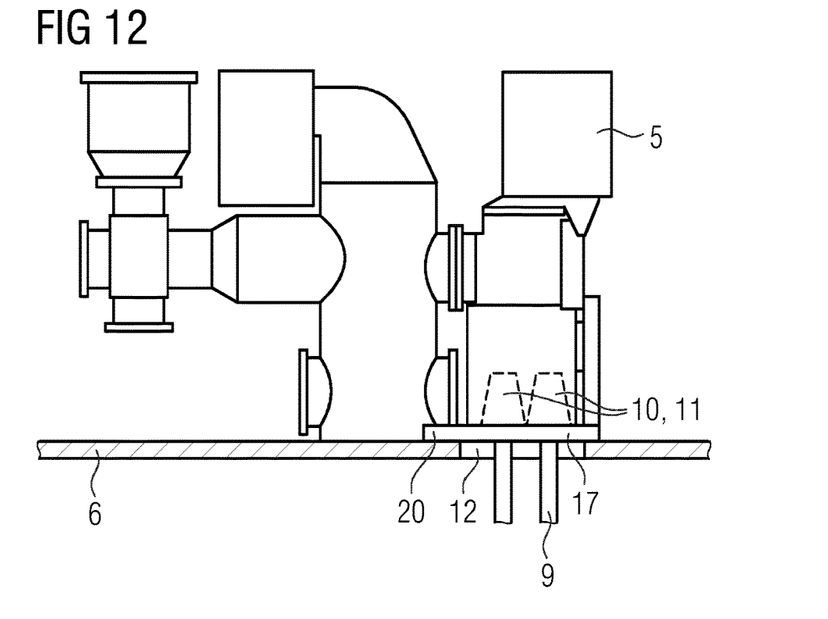
FIG. 12 shows a side view of a component arranged on a supporting structure illustrating the embodiment of a method.

In FIG. 11, the component 5 is depicted in a state, in which the connectors 10 have been engaged into their respective counterparts 11 and hence a connection of the component 5 to the connection means 9 has been established. Also, the guiding pin 27 has been engaged into the guiding orifice 28. It is possible that the component 5 remains in this position as depicted on top of the support frame 17. Alternatively, the component 5 may further be lowered to the top surface 14 of the supporting structure 6, as depicted in FIG. 12. The component may then be fixed to the supporting structure 6 and/or to the support frames 17, for instance by bolting.

In order to not obstruct the component 5, the connector support frame 17 may be collapsed. Alternatively, also a removal of the connector support frames 17 and/or a lowering of the connector support frames 17 through the opening 12 and/or further opening of the supporting structure 6 in order not to obstruct the arrangement of the component 5 is possible.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for connecting a component of a power conversion circuit of a wind turbine to one or more connection device(s), wherein the component is arranged on a supporting structure in the interior of the wind turbine, wherein the connection device(s) comprises at least one connector and the component comprises at least one counterpart to the at least one connector, comprising:
providing the connection device(s) and lifting the component from the supporting structure,
arranging the connection device(s) on the supporting structure and aligning the at least one connector of the connection device(s) with respect to the at least one counterpart at the component while the component is lifted, and
lowering the component onto the supporting structure and thereby establishing a connection between the at least one connector and the at least one counterpart for connecting the component to the connection device(s).

2. The method according to claim 1, wherein an electrical cable and/or a tube for fluid transportation is used as connection device(s).

3. The method according to claim 1, wherein a switch gear unit, a transformer, a power converter, an electrolyser, a fluid storage tank, a water treatment device, or a control cabinet is used as the component.

4. The method according to claim 1, wherein a first actuator arranged on the supporting structure and/or a second actuator arranged on a further supporting structure, which is arranged above the supporting structure, is used for lifting of the component.

5. The method according to claim 1, wherein the lifted component is suspended using at least one suspension support arrangement and/or that the lifted component is suspended by arranging and/or fixating the component on a further supporting structure above the supporting structure.

6. The method according to claim 1, wherein the connection device(s) is arranged on the supporting structure by guiding the connection device(s) from below the supporting structure through an opening in the supporting structure.

7. The method according to claim 1, wherein the connection device(s) further comprise a conical connector and a counterpart further comprises a conical socket or the connection device(s) further comprise a conical socket as connector and a conical counterpart are used.

8. The method according to claim 1, wherein the connection device(s) is arranged on the supporting structure using a connector support frame, wherein the connector support frame is arranged on the supporting structure and the at least one connector is mounted on the connector support frame in a distance to the supporting structure and facing upwards towards the lifted component.

9. The method according to claim 8, wherein the at least one connector is mounted on the connector support frame and is arrangeable in a distance between 0.75 m to 1.75 m from a top surface of the supporting structure.

10. The method according to claim 8, wherein the connector support frame is height-adjustable and/or collapsible, wherein the connector support frame is lowered and/or collapsed after connecting the at least one connector to the counterpart and/or during the lowering of the component towards the supporting structure.

11. The method according to claim 1, wherein at least one guiding device is used, which guides the component during lowering at least in the vicinity of the at least one connector by at least partly limiting a lateral movement of the component during lowering.

12. The method according to claim 11, wherein the guiding device further comprising at least one guiding structure is used, wherein the guiding structure is arranged on the supporting structure and/or on the or a connector support frame.

13. The method according to claim 12, wherein a guiding funnel is used as guiding structure.

14. The method according to claim 12, wherein at least one conical guiding pin is used as guiding structure, wherein the guiding pin is engageable into a corresponding conical guiding orifice at the component.

15. The method according to claim 14, wherein at least one guiding counterpart element is mounted to the component prior to or during the lowering, wherein the guiding counterpart element further comprising the conical guiding orifice.

* * * * *